United States Patent Office 3,401,209
Patented Sept. 10, 1968

3,401,209
RECOVERY OF BIPHENYL FROM HDA POLYMER
Theodore Eugene Majewski, Midland, Mich., assignor to The Dow Chemical Company, Midland, Mich., a corporation of Delaware
No Drawing. Filed Feb. 4, 1966, Ser. No. 525,116
2 Claims. (Cl. 260—672)

ABSTRACT OF THE DISCLOSURE

About 30–50% of the biphenyl present in still-bottoms from demethylation of toluene is recovered in 98% purity by cooling to 0°–15° C., washing the separated crude solid with ethanol, and fractionally distilling.

---

This invention relates to a process for separating biphenyl from closely related compounds. It relates particularly to a method whereby good yields of purified biphenyl can be obtained from the still bottoms of a hydrodealkylation process.

The production of benzene by the hydrogenative dealkylation of alkylated benzenes such as toluene, xylene, and cumene is now practiced on a very large scale. This process involves the reaction of excess hydrogen with an alkylbenzene, commonly toluene, at an elevated temperature which is usually in the range of 600–800° C. The process may be run in the presence of a metallic catalyst such as cobalt and molybdenum oxides or chromium oxide or no catalyst may be used. In any such process, a small proportion of the hydrocarbon feed is converted into by-products of higher molecular weight, particularly biphenyl. Also included among these byproducts are other polynuclear aromatic hydrocarbons such as fluorene, naphthalene, and terphenyl as well as non-aromatic hydrocarbons. These higher boiling byproducts are obtained as the main constitutents of still bottoms from the distillation of benzene and unreacted alkylbenzene from the condensed reaction product. Ordinarily, such still bottoms contain about 30–50 percent by weight of biphenyl as the largest single component, lesser quantities of other hydrocarbons as described above, and usually some unreacted alkylbenzene feed. Although the relative proportion of these still bottoms is low as compared to the volume of benzene produced, the actual quantity of this material is large because of the scale on which the process is worked. It would, therefore, be desirable to separate any commercially valuable component, particularly biphenyl, from this large volume of material which would otherwise go to waste.

However, the practical separation of biphenyl in acceptable yield and purity from this complex mixture of similar compounds presents an exceedingly difficult problem. The similar boiling points and similar solubilities of the compounds present make either distillation or recrystallization a generally ineffective means of separation.

It has now been found that by a combination of particular steps carried out in a specified order, better than fifty percent of the biphenyl contained in still bottoms such as described above can be separated as a pure chemical compound. Surprisingly, these same steps when carried out in a different order or like combinations of similar steps produce either or both substantially lower recoveries and a product of significantly lower quality. This novel combination comprises the following steps performed in the order indicated below. It has been found that in a process wherein an alkylated benzene is subjected to hydrodealkylation conditions to produce a reaction mixture containing benzene as a major constituent and biphenyl as a minor constituent and said mixture is fractionally distilled to obtain a distillation residue containing at least about 30 percent by weight of biphenyl, good recoveries of high purity biphenyl are obtained by (1) Cooling said residue to 0–15° C. to cause crystallization of the major part of the biphenyl content thereof as a crude solid,
(2) Separating the crude biphenyl from the mother liquor,
(3) Washing the crude biphenyl with an oxygen-containing water-soluble organic solvent as further described below, and
(4) Fractionally distilling the washed crude biphenyl.

By this procedure, better than half of the biphenyl present in the original still bottoms can be obtained as biphenyl of better than 98 percent purity.

Cooling the still bottoms to at least 15° C. and preferably to 5–10° C. is essential to obtain a practical recovery of biphenyl. These still bottoms customarily are partially solid at room temperature, but separation of this solid at 20–25° C., for example, provides a low recovery of biphenyl and the crude biphenyl thereby obtained yields a product no higher in quality than that from the lower temperature crystallization.

The washing step is essential to remove in at least substantial part an impurity or impurities which interfere with further purification by distillation. This step, which is carried out at 0–30° C. and usually at ambient temperature, requires contacting of the crude biphenyl with about 0.1–3 ml. of solvent per gram of solid. Applicable solvents are oxygenated organic liquids capable of dissolving at least 10 percent by weight of water at 25° C. These include the lower alkanols, i.e., methyl, ethyl, propyl, isopropyl, butyl, sec-butyl, isobutyl, and tert-butyl alcohols, acetone, methyl ethyl ketone, p-dioxane, and the lower alkyl monoethers of ethylene and propylene glycols. These latter include particularly 2-methoxyethanol and methoxypropanol, but the corresponding ethyl, propyl, and butyl ethers can be used as well. Mixtures of these solvents are also operable and the solvent may contain up to about 10 percent by weight of water. Aqueous ethanol containing 0.5–10 percent by weight of water is preferred.

The fractional distillation step provides the final purification of the product. The principal impurity remaining in the crude biphenyl after the crystallization (or coring) and washing steps is easily and substantially completely eliminated by a conventional fractional distillation. This distillation can be carried out under atmospheric pressure, but is preferably done under reduced pressure because of the temperatures involved. Substitution of a recrystallization for the distillation of the crude biphenyl fails to improve the quality of the product significantly.

The following example illustrates a preferred embodiment of the invention. The results thereby obtained are contrasted with the inferior results found by using other combinations of purification steps and combinations of different conventional procedures.

EXAMPLE

Still bottoms from the distillation of a mixture obtained by hydrodealkylating toluene at 600–800° C. over a $Cr_2O_3$-$Al_2O_3$ catalyst contained 45 percent by weight of biphenyl and about 10 percent of toluene, the remainder being largely a mixture of polynuclear aromatic and other hydrocarbons. A sample of 1605 g. of these still bottoms was cooled to 10° C., thereby causing crystallization of a yellow solid. The crystals were filtered from the mother liquor and were washed with two 200 ml. portions of 2B absolute ethyl alcohol. The dried crystals amounted to 576 g. Of this, 137.7 g. was fractionally distilled under reduced pressure to obtain a 91.5 g. cut boiling at 126–129/14 mm. This cut had a freezing point of 68.2° C.

and was determined to be biphenyl of 98.6 percent purity. This represents a recovery of 52.3 percent of the biphenyl originally present in the still bottoms as a pure material.

The distillation in the above example and in the following experiments was carried out using a Vigreux column of about 2 theoretical plates efficiency. All of the distillations described were done under substantially the same operating conditions.

A series of experiments was run on the same still bottoms using various other combination of work-up steps.

Experiment A

A sample of 1642 g. of still bottoms was cooled to 10° C. and the resulting yellow crystals were separated on a filter and washed with five portions of isopropyl alcohol, using 50 ml. of solvent per 100 g. of solid for each wash. The washed and dried crude biphenyl amounted to 28.0 percent of the starting still bottoms and analyzed 84.5 percent biphenyl. A 100 g. portion of this material was recrystallized from 58 ml. of 2B absolute ethyl alcohol and the crystals thereby obtained were washed with fresh alcohol. The recrystallized product weighed 64.0 g. and was found to be biphenyl of 85.8 percent purity. Recrystallization had failed to improve the purity significantly.

Experiment B

A portion of still bottoms was cooled to 25° C. and filtered to separate the crystalline solid. A part of this solid was fractionally distilled to obtain as the biphenyl fraction a solid freezing at 66.8° C. and analyzing 98.0 percent biphenyl. This fraction represented 30.1 percent of the biphenyl present in the starting still bottoms.

Experiment C

The procedure of Experiment B was repeated except for a wash of the crude solid with several portions of methanol prior to distillation. The distilled biphenyl fraction amounted to 29.2 percent of the biphenyl in the starting still bottoms and its purity was essentially the same as the product of B.

Experiment D

A sample of still bottoms was fractionally distilled to obtain a biphenyl cut amounting to 36 percent of the starting material and containing 81.3 percent by weight biphenyl. This represented 65 percent of the biphenyl in the starting still bottoms. A portion of this biphenyl cut was recrystallized from 2B absolute ethyl alcohol using 0.7 ml. of alcohol per g. of biphenyl cut. The recrystallized biphenyl was washed with fresh alcohol and dried to obtain a product analyzing 97.2 percent biphenyl and representing a recovery of 31.4 percent of the biphenyl in the starting still bottoms.

Experiment E

Another portion of the biphenyl cut from Experiment D was redistilled under reduced pressure. No biphenyl fraction having a purity substantially better than that of the starting cut could be separated.

Experiment F

The procedure of example was repeated except that the washing step was omitted. No biphenyl fraction having purity higher than about 95 percent could be separated.

The procedures and results of the above example and experiments are summarized and compared in the following table.

TABLE

| Example | A | B | C | D | E | F |
|---|---|---|---|---|---|---|
| Procedure | Cored, 10° C., washed, distilled | Cored, 10° C., washed, recryst. | Cored, 25° C., distilled | Cored, 25° C., washed, distilled | Distilled, recryst., washed | Distilled, redist. | Cored, 10° C., distilled |
| Percent biphenyl recovery | 52.3 | 34.1 | 30.1 | 29.2 | 31.4 | | |
| Purity | 98.6 | 85.8 | 98.0 | 98 | 97.2 | ca. 85 | ca. 90 |

I claim:
1. In a process wherein an alkylated benzene is subjected to hydrodealkylation conditions to produce a reaction mixture containing benzene as a major constituent and biphenyl as a minor constituent and said mixture is fractionally distilled to obtain a distillation residue containing at least about 30 percent by weight of biphenyl, the improvement of
  (1) cooling said residue to 0–15° C., thereby causing the formation in said residue of a solid crude biphenyl,
  (2) separating said crude biphenyl from said residue,
  (3) washing said crude biphenyl with 0.1–3 ml. per gram of crude biphenyl of at least one solvent from the group consisting of lower alkanols, acetone, methyl ethyl ketone, lower alkyl monoethers of ethylene glycol, lower alkyl monoethers, of propylene glycol, p-dioxane, and mixtures of said solvent with up to about 10 percent by weight of water, and
  (4) fractionally distilling the washed crude biphenyl to obtain a purified biphenyl fraction.
2. The process of claim 1 wherein the solvent is aqueous ethanol containing up to 10 percent by weight of water.

References Cited

UNITED STATES PATENTS 3,296,323   1/1967   Myers et al.   260—672

OTHER REFERENCES

Fowle and Pitts: "Thermal Hydrodealkylation," Chem. Eng. Progress 58 37–40 (1962).

Feigelman et al.: "Dealkylate Toluene to Benzene," Hydroc. Processing 44 147–50 (1965).

Ismailov et al.: "Biphenyl From Pyrolysis Product," Azerb. Neft. Khoz. 44 30–1 (1965) (Russian); C.A. 64 4972b.

DELBERT E. GANTZ, *Primary Examiner.*

G. E. SCHMITKONS, *Assistant Examiner.*